United States Patent [19]

de Lang et al.

[11] 4,410,241
[45] Oct. 18, 1983

[54] DEVICE FOR PROCESSING OPTICAL INFORMATION AND METHOD OF MANUFACTURING A COMA CORRECTION PLATE USED IN SUCH A DEVICE

[75] Inventors: Hendrik de Lang, Heeze; Gijsbertus Bouwhuis, Eindhoven, both of Netherlands

[73] Assignee: U.S. Philips Corporation, New York, N.Y.

[21] Appl. No.: 200,712

[22] Filed: Oct. 27, 1980

[30] Foreign Application Priority Data

Aug. 29, 1980 [NL] Netherlands ............... 8004892

[51] Int. Cl.³ .............................................. G02B 27/00
[52] U.S. Cl. ............................ 350/409; 350/432; 350/447; 358/348; 369/112
[58] Field of Search ............... 350/409, 447, 133, 330, 350/432, 448, 436, 440; 427/166, 167; 358/128.5, 130, 132

[56] References Cited

U.S. PATENT DOCUMENTS 3,028,793 5/1962 Bousky et al. .................. 350/432
3,097,255 7/1963 FarQuuhar et al. ............. 350/475

Primary Examiner—John K. Corbin
Assistant Examiner—Paul M. Dzierzynski
Attorney, Agent, or Firm—Jack Oisher; Robert T. Mayer; Algy Tamoshunas

[57] ABSTRACT

A device is disclosed for processing optical information comprising a system of optical elements (6, 7, 9, 10, 12, 13) arranged along an optical main axis (11) for guiding a light beam (4) to a radiation-sensitive detection system (8) at least one coma correction plate (13, 20, 21) is provided in the system of optical elements and comprises a substrate having a dielectric layer varying in thickness so as to at least partly compensate for axial coma due to differences in path length of the light rays.

Also disclosed is a method of manufacturing such a coma correction plate in which during the vapor deposition of the dielectric layer, a plate-shaped substrate (31) is moved at a constant speed below a template (33) parallel to an axis (34) which is situated in the plane of the template. The template (33) is situated between the vapor deposition source (30) and the substrate (31) and has an aperture (34) which is divided by the axis. A part (36) of the edge of the aperture on either side of the axis varies as a third power function of the distance to the axis, the point of intersection (37) of the axis with the part of the edge being taken as zero point.

6 Claims, 8 Drawing Figures

DEVICE FOR PROCESSING OPTICAL INFORMATION AND METHOD OF MANUFACTURING A COMA CORRECTION PLATE USED IN SUCH A DEVICE

The invention relates to a device for processing optical information, comprising a system of optical elements arranged along an optical main axis for guiding a light beam to a radiation-sensitive detection system.

The invention also relates to a method of manufacturing a coma correction plate used in said device.

A device according to the invention may be, for example, an objective of a television camera, a microscope or a device for reading a record carrier, on which information is recorded in an optically readable information structure.

Such a device as mentioned in the opening paragraph is disclosed in Philips' Technisch Tijdschrift 33, No. 7, pp. 194-197, which describes a device for reading a record carrier. In this case it is a VLP disc player (VLP is a trade mark of N. V. Philips' Gloeilampenfabrieken) which is meant to read video and/or audio information which is recorded on a disc. The information is recorded on the surface of the disc in the form of pits which are 0.8 μm wide and approximately 0.16 μm deep and which have a variable length. The pits are situated on a spiral-like track having a pitch of approximately 2 μm. For reading the information, a light spot is projected on the track by means of a light source and a number of optical elements. The light is reflected at the disc surface and captured again by the optical elements and concentrated on a detector, for example a photodiode. Deflection occurs at the pits in the disc surface so that the deflected radiation no longer falls on the optical elements. Hence, when the light spot passes over the pits, the detector will receive less light than when the light spot passes over a flat part. In this manner the signal at the output of the detector is modulated. The information may be coded in the frequency of the pits and/or in the ratio of the length of the pits relative to the length of the intermediate region present between two pits. The information may also be coded in a digital form. In addition to video and audio information, digital information, for example from and for a computer, may also be recorded on the disc.

An optical system which can observe the pits individually and which can follow the track so accurately that cross-talk between two adjacent tracks is prevented must satisfy very high requirements of display sharpness and mechanical precision. On the other hand, with a view to production in large numbers, the system must be as simple as possible, cheap and easy to adjust.

In cheap systems consisting of optical elements, no narrow centring tolerances can be imposed so that inadmissible axial coma may occur. In the above-described VLP-players this coma is expressed, for example, in a one-sided haze (comet-tail) near the light spot.

It is therefore an object of the invention to provide a device of the kind described in the opening paragraph which, due to a simple and cheap measure, has a small coma and which is easy to adjust.

According to the invention, a device of the kind described in the opening paragraph is characterized in that the system of optical elements comprises at least one coma correction plate comprising a substrate having a dielectric layer varying in thickness such that the differences in path length of the light rays which produce axial coma, are at least partly compensated for.

The thickness of the dielectric layer represents the correction of path length. The refractive index of the material of the dielectric layer effects the light velocity in the layer and, hence, the differences in path length.

Such coma correction plates can also be used very readily in devices in which the optical components have large dimensions.

The dielectric layer may be provided, for example, by means of a spraying process, by sputtering or by vapour deposition. When the differences in thickness variation are small, vapour deposition is of course the most suitable method. As substrate materials may, for example, be glass or quartz. However, it is alternatively possible to use another optical element, for example a lens, a mirror or a filter, as a substrate. The dielectric layer may be manufactured, for example, from $SiO_2$, $ZnS$, $TiO_2$, etc.

In the device according to the invention the dielectric layer is preferably manufactured from a material which has a refractive index which is equal to or substantially equal to the refractive index of the material of the substrate. In that case, substantially no reflections occur at the interface between the dielectric layer and the substrate, which reflections may cause interferences. In a VLP-player, for example, these reflections may give rise to undesired fluctuations in the output power of the laser. Reflected light at the area of the detector may also interfere with the primary modulated light beam and give rise to very deep modulation of the detector signal.

Such fluctuations of the output power and modulation are undesired in many cases also in other applications, for example, interferometers.

A preferred embodiment of the device in accordance with the invention is characterized in that two coma-correction plates are used and the thickness Z of the dielectric layers on the plates from the optical main axis in a first direction is constant and in the direction $\eta$ perpendicular thereto varies according to the function $$Z = a\eta^3$$

where $\eta=0$ is situated on the optical main axis and wherein a is a constant which depends on the desired quantity of compensating axial coma $W_{31}$ and on the refractive index n of the material of the dielectric layer, in which it holds that $$a = \frac{4}{3\sqrt{3}} \cdot \frac{W_{31}}{(n-1)}$$

and which first directions of the axial coma correction plates are rotated around the said optical main axis over an angle of 60° relative to each other.

The thickness variation of the dielectric layer on the first axial coma correction plate is $$Z_1 = a\eta_1^3$$

and on the second axial coma correction plate $$Z_2 = a\eta_2^3$$

When changing to polar coordinates we find for the resulting thickness of the two layers that:

$$Z = Z_1 + Z_2 = a(\eta_1^3 + \eta_2^3) =$$

$$a\, r^3 \cdot \{\sin^3(\phi - 30°) + \sin^3(\phi + 30°)\} = \frac{3}{4}\, a\, \sqrt{3}\, r^3 \sin\phi$$

which is exactly the thickness variation required for a given correcting coma. The layers with the thickness variation $Z_1$ and $Z_2$ may each be provided on opposite sides of a substrate so that two integrated coma correction plates have been formed. However, it is alternatively possible in accordance with the invention that one coma correction plate is used and the thickness $Z$ of the dielectric layer as a function of the place in polar coordinates $r$ and $\phi$ on the plate varies mainly according to the function:

$$Z = \frac{3}{4}\, a\, \sqrt{3}\, r^3 \sin\phi$$

wherein $r=0$ is situated on the optical main axis and wherein $a$ is a constant which depends on the desired quantity of compensating axial coma $W_{31}$ and on the refractive index $n$ of the material of the dielectric layer, in which it holds that:

$$a = \frac{4}{3\sqrt{3}} \cdot \frac{W_{31}}{(n-1)}$$

$W_{31}$ determines the axial values of the coma term in the function $\omega_{(r, \phi)}$ which represents the wave front aberrations. This is a generally known notation for the aberrations and is used, for example, in J. Opt. Soc. Am. 69 No. 1, 14, 1979 (formula 6.27) and in "Wave Theory of Aberrations" of H. H. Hopkins, Oxford, Clarendon Press 1950.

The invention will now be described in greater detail, by way of example, with reference to a drawing, in which.

Figure 5:
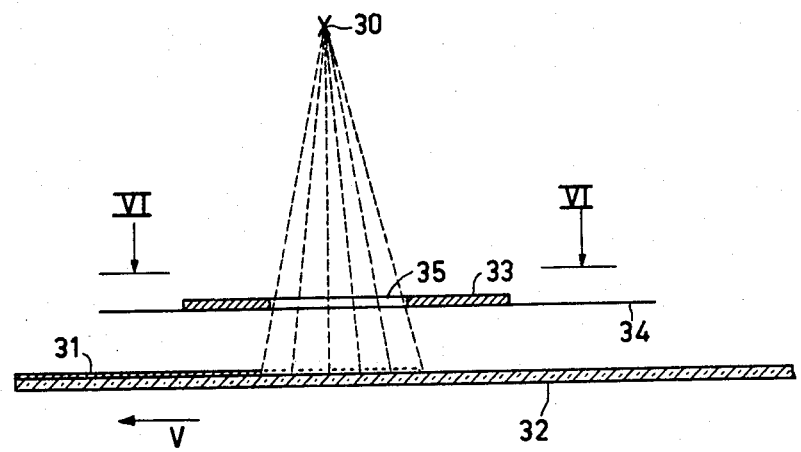
Figure 6:
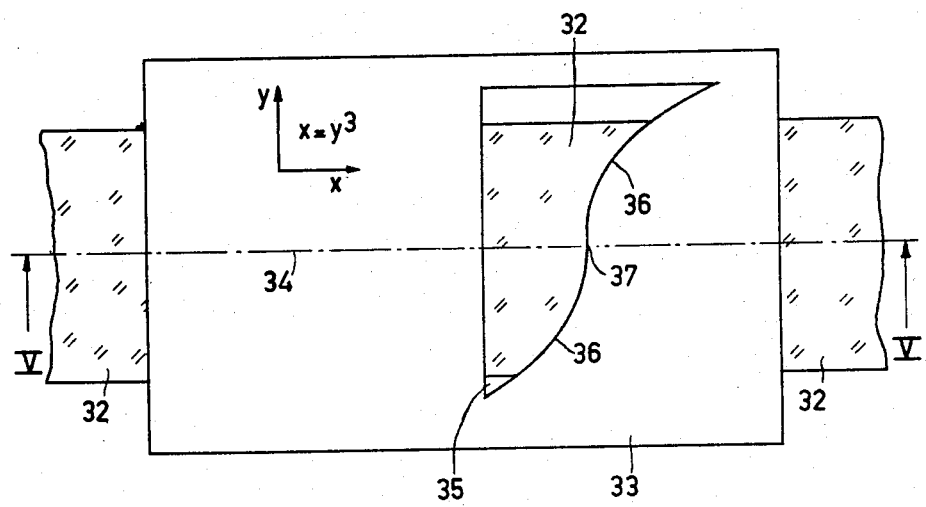

FIGS. 5 and 6 further explain the method of manufacturing coma correction plates.

Figure 1:
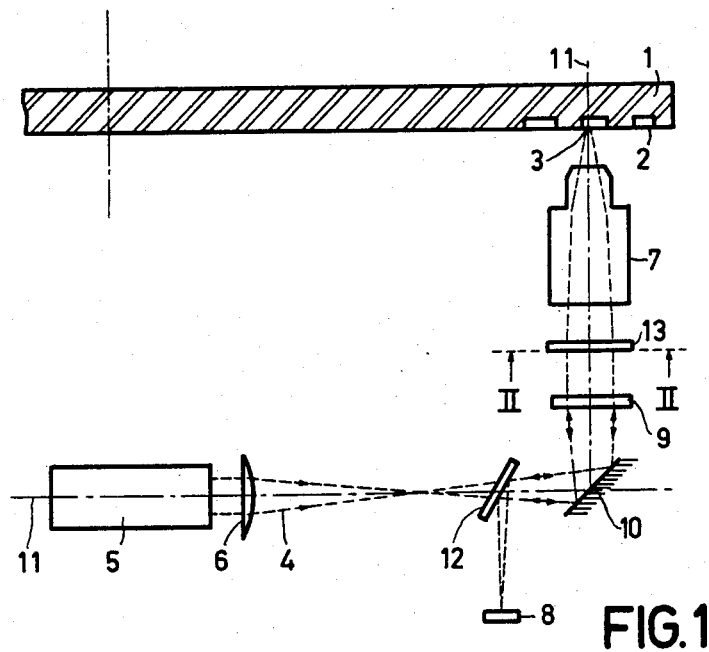
FIG. 1 shows diagrammatically a device according to the invention.

FIG. 1 shows diagrammatically a device according to the invention, in this case a device for reading a record carrier on which information, for example, video and-/or audio information, has been provided in an optically readable information structure. In this Figure a disc-shaped record carrier 1 which comprises information tracks 2 is shown in cross-section. A light spot 3 is displayed on the record carrier, which spot is formed by a light beam 4 originating from a light source 5 behind which a lens 6 is placed. The light beam 4 is focused by an objective 7 in the plane of the information tracks to form the light spot 3 which has a diameter in the order of magnitude of the pits in the information tracks. The light beam is modulated and reflected by the information structure and traverses the objective 7 for the second time and is displayed on the detector 8. The light from the light source 5 is linearly polarized. As a result of this a separation of the incident and reflected light can be obtained by means of a $\frac{1}{4}\lambda$ plate 9 and a polarization-sensitive dividing mirror 12. The system furthermore comprises a flat mirror 10. Since the elements of the objective 7 are not accurately centred around the optical main axis 11, an axial coma correction plate 13 is provided which has a coma which at least partly compensates for the coma of the objective 7. As a result of this a light spot without a one-sided haze (comet-tail) is obtained.

Figure 2:
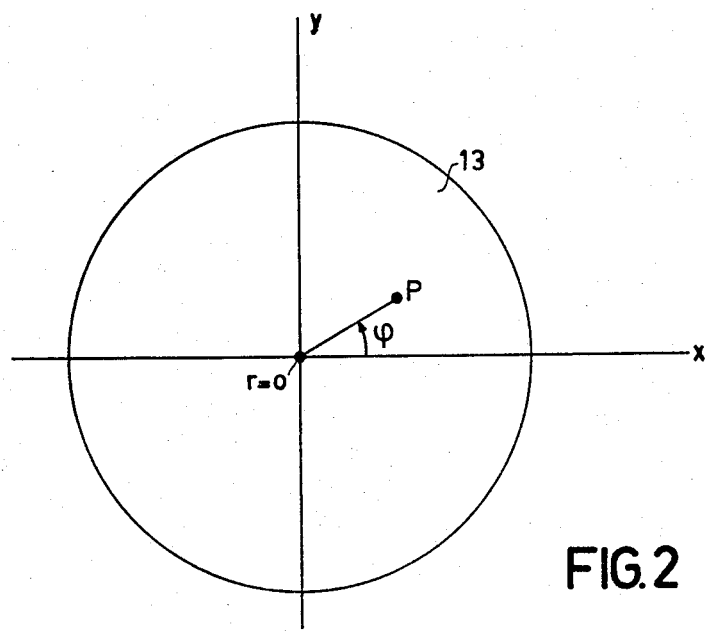
FIG. 2 shows diagrammatically a coma correction plate.

FIG. 2 is a diagrammatic elevation of the axial coma correction plate 13. The optical main axis is perpendicular to the plane of the drawing and passes through the point $r=0$. The plate consists of a substrate of quartz having a refractive index $n=1.46$ with a dielectric layer of $SiO_2$ thereon varying in thickness according to the invention. The thickness $Z$ of the dielectric layer depends inter alia on the location P on the plate, the location being fixed by the polar coordinates $r$ and $\phi$. In practice, an assortment of coma correction plates of different strengths is manufactured. For example, a plate having a thickness variation from 0 to 2000 Å, a plate having a thickness variation from 0 to 4000 Å and a plate having a thickness variation from 0 to 6000 Å, for use in a device shown in FIG. 1, in which a He-Ne laser is used as a light source. Depending on the axial coma observed in the system, a coma correction plate having a given strength is selected from the assortment, placed in the device and rotated about the optical main axis until the total axial coma is at a minimum and the device satisfies the required specifications. The manufacture of axial coma correction plates will be described in the specification with reference to FIGS. 5 and 6.

Figure 3A:
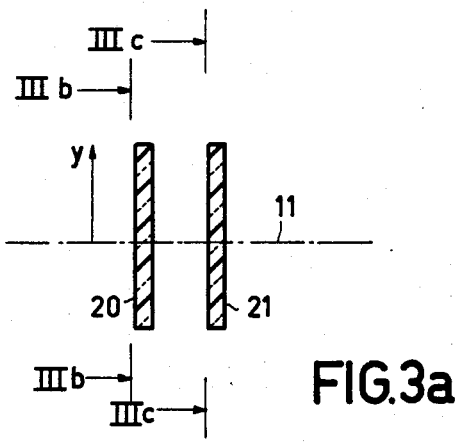
FIGS. 3a, 3b and 3c are a diagrammatic sectional view and plan views of two coma correction plates.
Figure 3B:
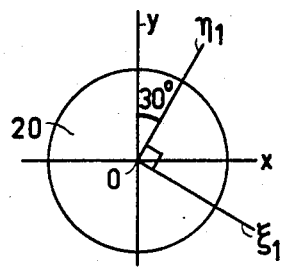
Figure 3C:
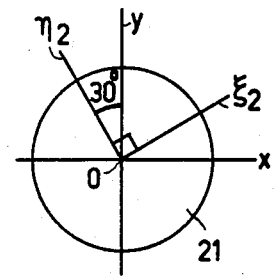

FIG. 3a is a sectional view of a set of two axial coma correction plates 20 and 21 parallel to the X-Y plane which is perpendicular to the optical main axis 11. The X-axis is perpendicular to the plane of the drawing. FIGS. 3b and 3c are elevations of the two plates. The optical main axis 11 in both Figures is perpendicular to the plane of the drawing and passes through the point 0 ($\eta=0$, $\xi=0$). The thickness $Z$ of the dielectric layer on the plate 20 is constant in the $\xi$ direction and varies in the $\eta_1$ direction according to the function:

$$Z = a\eta_1^3$$

The thickness $Z$ of the dielectric layer on plate 21 is constant in the $\xi_2$ direction and varies in the $\eta_2$ direction according to the function:

$$Z = a\eta_2^3$$

The $\eta_1$ and $\eta_2$ directions make an angle of 60° with each other. This has for its result, as already proved above, that the resulting thickness of both dielectric layers together varies according to:

$$Z = \frac{3}{4} \cdot a \cdot \sqrt{3}\, r^3 \sin\phi$$

when changing to polar coordinates $r$ and $\phi$.

Figure 4:
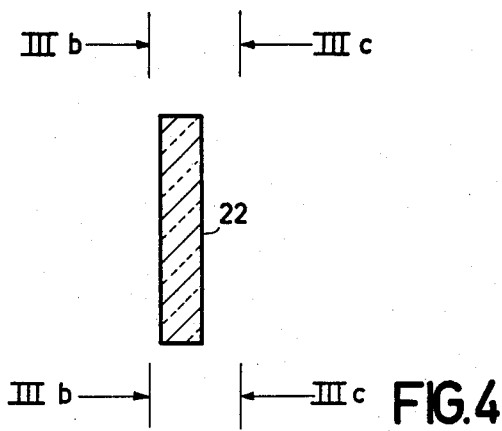
FIG. 4 shows diagrammatically an integrated coma correction plate.

In FIG. 4 the dielectric layers according to FIGS. 3b and 3c are provided on the two sides of one substrate 22.

A method of manufacturing coma correction plates will now be described in greater detail, by way of example, with reference to FIGS. 5 and 6.

FIG. 5 shows diagrammatically a vapour deposition device comprising a vapour source 30 for evaporating the dielectric material to form the dielectric layer 31 on the strip-shaped substrate 32. During the vapour deposition the substrate 32 is passed below a template 33 at a constant speed V parallel to axis 34. The template 33 comprises an aperture 35. FIG. 6 shows the shape of said aperture 35. Aperture 35 is divided by axis 34. A part 36 of the edge of the aperture on either side of the axis varies as a third power function of the distance to the axis 34, the point of intersection 37 of the axis 34 with that part of the edge 36 being taken as zero point. The curvature of the part 36 of the edge varies according to $$x = c y^3,$$

where y is positive on one side of the zero point 37 and is negative on the other side. The desired thickness variation can be obtained by choice of the constant c and/or the velocity V. By this way of vapour deposition, a strip-shaped substrate is obtained having a thickness variation of the dielectric layer which is constant in the direction of the axis 34 and has the desired third power variation in the direction perpendicular thereto. This strip-shaped substrate covered in this manner can then be divided into small substrates which may be used in a system of two coma correction plates as described in the FIGS. 3a, b and c. However, it is alternatively possible to rotate the small substrates covered with one dielectric layer in the plane of the substrates over an angle of 60° and again covering them in the vapour deposition device as a result of which a coma correction plate as described in FIG. 2 is obtained.

What is claimed is:

1. A device for processing optical information comprising a system of optical elements arranged along an optical main axis for guiding a light beam to a radiation-sensitive detector and means for correcting for coma produced by said system, said correcting means including two dielectric layers arranged along said main axis and extending perpendicularly thereto, each dielectric layer having a thickness Z which is constant in a first direction extending perpendicularly from sadi main axis and which varies in a second direction, $\eta$, which is perpendicular to said first direction, in accordance with the function:

$$Z = a \eta^3$$

where $\eta = 0$ is situated on the optical main axis and where a is a constant which depends on the value of coma $W_{31}$ to be compensated for and on the refractive index n of the material of the dielectric layer, such that:

$$a = \frac{4}{3\sqrt{3}} \cdot \frac{W_{31}}{(n-1)}$$

said dielectric layers being oriented so that said first directions on the respective layers are inclined with respect to each other at an angle of approximately 60°.

2. The device according to claim 1 wherein said correcting means includes a planar substrate and a respective one of said dielectric layers is disposed on a respective one of two opposite surfaces of said substrate.

3. The device according to claim 1 wherein said correcting means includes two planar substrates and a respective one of said two dielectric layers is disposed on a respective one of said two substrates.

4. A device as claimed in claim 1 wherein the dielectric layer is made from a material having a refractive index which is equal to or substantially equal to the refractive index of the material of the substrate.

5. A device for processing optical information comprising a system of optical elements arranged along an optical main axis for guiding a light beam to a radiation-sensitive detector and means for correcting for coma produced by said system, said correcting means including a planar substrate arranged along said main axis and extending perpendicularly thereto and a dielectric layer disposed on said substrate, said layer having a thickness Z which varies as a function of $\Gamma$ and $\phi$, where $\Gamma$ and $\phi$ are polar coordinates of a given point on said dielectric layer with respect to said main axis such that $$Z = \frac{3}{4} \cdot a \sqrt{3} \, r^3 \sin\phi$$

wherein r=0 is situated on the optical main axis and wherein a is a constant which depends on the value of coma $W_{31}$ to be compensated for and on the refractive index n of the material of the dielectric layer, such that:

$$a = \frac{4}{3\sqrt{3}} \cdot \frac{W_{31}}{(n-1)}.$$

6. A device as claimed in claim 5 wherein said dielectric layer is made from a material having a refractive index which is equal to or substantially equal to the refractive index of the material of the substrate.

* * * * *

UNITED STATES PATENT AND TRADEMARK OFFICE
CERTIFICATE OF CORRECTION

PATENT NO. : 4,410,241
DATED : October 18, 1983
INVENTOR(S) : HENDRIK DE LANG ET AL It is certified that error appears in the above-identified patent and that said Letters Patent is hereby corrected as shown below:

Claim 1, line 9, change "sadi" to --said--

Claim 5, line 9, after "of" change "$\bar{r}$" to -- r --
and after "where" change "$\bar{r}$" to -- r --

Signed and Sealed this

Eighth Day of April 1986

[SEAL]

Attest:

DONALD J. QUIGG

Attesting Officer

Commissioner of Patents and Trademarks